United States Patent
Volpe et al.

(10) Patent No.: US 10,459,662 B1
(45) Date of Patent: Oct. 29, 2019

(54) WRITE FAILURE HANDLING FOR A MEMORY CONTROLLER TO NON-VOLATILE MEMORY

(71) Applicant: Amazon Technologies, Inc., Seattle, WA (US)

(72) Inventors: Thomas A. Volpe, Austin, TX (US); Mark Anthony Banse, Austin, TX (US); Steven Scott Larson, Georgetown, TX (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 15/717,759

(22) Filed: Sep. 27, 2017

(51) Int. Cl.
*G06F 3/06* (2006.01)
*G06F 12/1009* (2016.01)

(52) U.S. Cl.
CPC .......... *G06F 3/0659* (2013.01); *G06F 3/0604* (2013.01); *G06F 3/0619* (2013.01); *G06F 3/0647* (2013.01); *G06F 3/0656* (2013.01); *G06F 3/0679* (2013.01); *G06F 12/1009* (2013.01); *G06F 3/067* (2013.01); *G06F 2212/1016* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 7,120,729 B2 | 10/2006 | Gonzalez et al. | |
| 7,526,598 B2 | 4/2009 | Stern et al. | |
| 7,958,430 B1 | 6/2011 | Kolokowsky et al. | |
| 8,185,685 B2 | 5/2012 | Selinger | |
| 8,412,985 B1 | 4/2013 | Bowers et al. | |
| 9,158,671 B2 | 10/2015 | Ryu et al. | |
| 9,838,240 B1 * | 12/2017 | Cormie | G06F 3/0607 |
| 2013/0250692 A1 * | 9/2013 | Manea | G11C 16/10 365/185.18 |
| 2014/0298116 A1 * | 10/2014 | Bodmer | G06F 11/3485 714/54 |
| 2015/0309753 A1 * | 10/2015 | Gemmeke | G06F 13/1668 711/103 |

OTHER PUBLICATIONS

U.S. Appl. No. 15/838,297, filed Dec. 15, 2017, Volpe, et al.
U.S. Appl. No. 15/717,763, filed Sep. 27, 2017, Volpe, et al.

* cited by examiner

*Primary Examiner* — Brian R Peugh
(74) *Attorney, Agent, or Firm* — Robert C. Kowert; Meyertons, Hood, Kivlin, Kowert & Goetzel, P.C.

(57) ABSTRACT

Failed write handling can be implemented at a memory controller for non-volatile memory. Failure of a write to a storage location in the non-volatile memory may be detected. An indication of the failure may be sent to a microcontroller for the non-volatile memory which may return an instruction to write to a different location in the non-volatile memory. Reads and writes to the storage location of the failed write may still be allowed, in some embodiments, by redirecting the reads and writes to a copy of data of the failed write stored in a copy buffer in the memory controller.

20 Claims, 10 Drawing Sheets

US 10,459,662 B1

WRITE FAILURE HANDLING FOR A MEMORY CONTROLLER TO NON-VOLATILE MEMORY

BACKGROUND

Non-volatile memory offers opportunities to bridge the shortcomings of other types of data storage. With access speeds faster than traditional block-based storage devices, non-volatile memory can increase the capacity of an implementing system to store information for data intensive applications that utilize large amounts of memory as the cost per unit of storage (e.g., dollars per Gigabyte) may be significantly less. Moreover, non-volatile memory can be accessible to a system in a manner similar to volatile system memory, while offering greater granularity for applications and other software or hardware resources utilizing non-volatile memory to store smaller amounts of specific data (e.g., byte addressable as opposed to block addressable) in a persistent form. Techniques that improve the speed of accessing and managing non-volatile memory are thus highly desirable.

Figure 1:
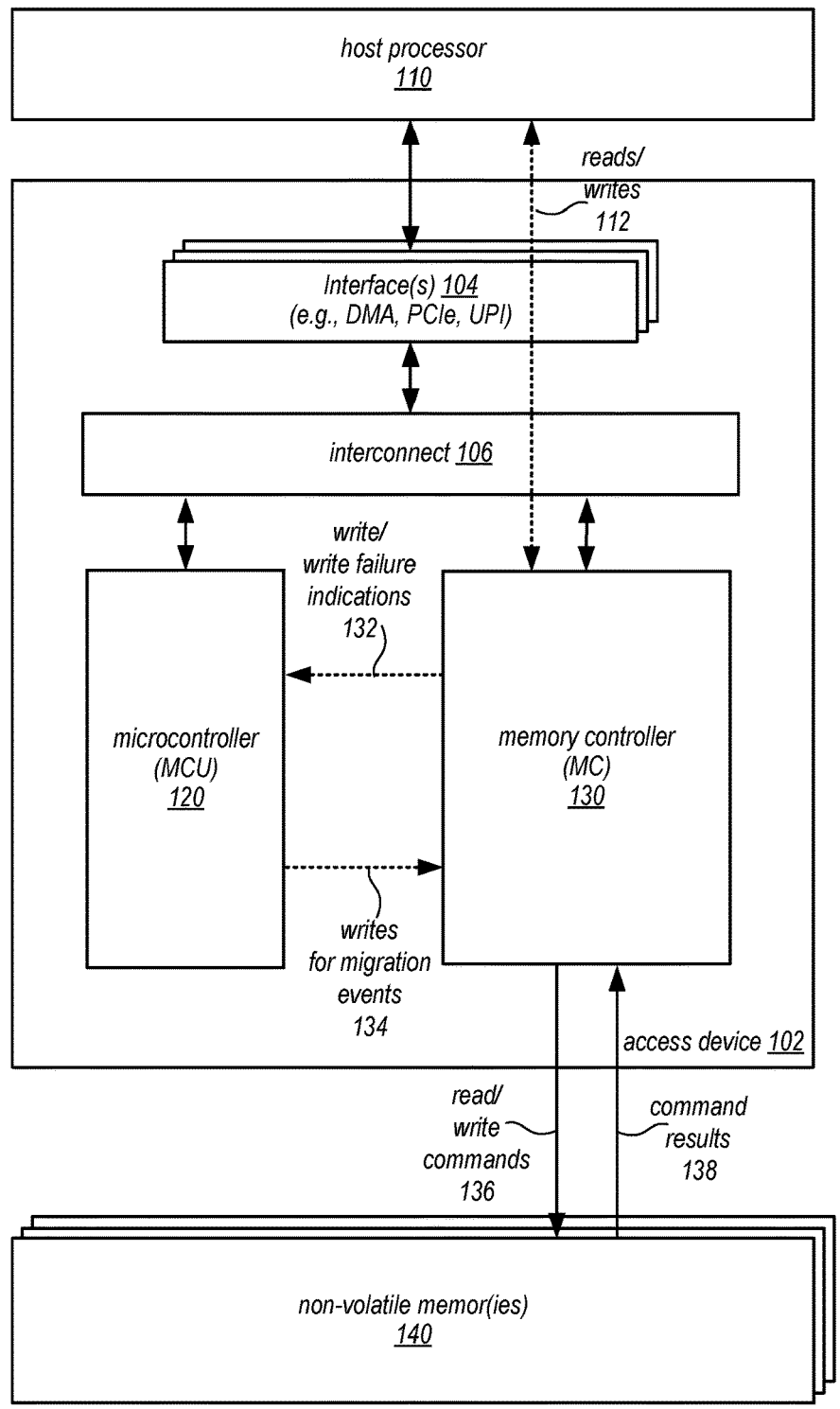
FIG. 1 illustrates a logical block diagram of a host system that implements an access device for a non-volatile memory that includes a microcontroller and memory controller to manage access to the non-volatile memory, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of a microcontroller for managing migration events performed by a memory controller are described herein and various embodiments of write failure handling at a memory controller for non-volatile memory are described herein. Non-volatile memory offers performance characteristics that provide different optimization opportunities for accessing and managing data stored thereon. Faster access times may be taken advantage of by a hardware memory controller performing reads and writes to data in the non-volatile memory, reducing latency in the access path, in various embodiments. Complex management operations can be moved into a separate microcontroller that steps in to help with managing non-volatile memory in differing scenarios, in some embodiments. The resulting division of labor may allow for increased access performance to non-volatile memories without sacrificing the sophisticated management techniques applicable through hardware and software to perform more complex operations, in various embodiments.

FIG. 1 illustrates a logical block diagram of a host system that implements an access device for a non-volatile memory that includes a microcontroller and memory controller to manage access to the non-volatile memory, according to some embodiments. Host processor 110 may host or implement various computing resources, such as virtual computing resources (e.g., a hypervisor offering access to one or more droplets, instances, or other resources operating within the virtual environment offered, operating systems, applications or other hosted resources, in some embodiments. Host processor 110 may be implemented as part of a computing system, like computing system 1000 discussed below with regard to FIG. 10, or other computing server, node, or device that provides the resources utilizing or executing upon host processor 110 with access to the storage offered by non-volatile memor(ies) 140, in some embodiments. For example, host processor 110 may implement resources that utilize non-volatile memor(ies) 140 to provide various storage configurations, operations, or improvements, including, but not limited to byte addressable storage access to read/write to a cacheable memory (which may be different than, and thus may have a higher latency than volatile memory devices, such as system memory 1020 in FIG. 10), optimizations for virtualizations platforms (e.g., allowing a hypervisor for virtual compute instances to move data directly using a direct memory access interface between system memory and non-volatile memor(ies), persistent memory storage, or memory mapped access to a file (e.g., using "mmap" or Linux Direct Access (DAX)), or block addressable storage access to provide faster caching of pages (by transferring data from block-based storage devices, like hard disk drives, to non-volatile memory 140 for faster access to host processor 110 and possible fast transfer using techniques like Direct Memory Access (DMA) to move data into system memory) or as fast block storage, among other examples in some embodiments.

Access device 102 may be implemented as dedicated hardware channel to provide access to one or multiple non-volatile memories 140, in various embodiments. For example, access device 102 may be implemented as an application specific integrated circuit (ASIC), field programmable gate array (FPGA), system-on-a-chip (SoC), or other dedicated circuitry that processes various access requests from host processor 110 for non-volatile memor(ies) 140. Access device 102 may implement one or more interface(s) 104 to receive access requests from host processor 110. For example, interface(s) 104 may include Peripheral Component Interconnect Express (PCIe), Intel UltraPath Interconnect (UPI), or Direct Memory Access (DMA) or enhanced DMA (eDMA), among other example interfaces. For example, a DMA interface 104 may accept read or write requests 112 from host processor to be performed with respect to data stored in (or to be stored in) non-volatile memor(ies).

Interfaces 104 may dispatch requests from host processor 110 to the appropriate access device component via interconnect 106, in some embodiments, or facilitate communications between access device components, such as writes for migration events 134 sent from MCU 120 to MC 130. For example, interconnect 106 may be one of various different kinds of bus architectures, such as Advanced eXtensible Interface (AXI). Access requests, such as read or write requests 112, may be sent to MC 130 via or memory controller (MC) 130 via interconnect 106. MC 130 may send read and write commands 136 to non-volatile memor(ies) 140 and receive command results 138, which may be returned to host processor 110 via interconnect 106 and interface(s) 104.

As discussed in more detail below with regard to FIGS. 3, 7, 8 and 9, MC 130 may perform read and write commands 136 in response to requests received directly from host processor 110 (e.g., via interfaces 104 and interconnect 106 as opposed to receiving host access requests via MCU 120), in some embodiments. MC 130 may receive the results of the commands 138 and provide data in response to reads, and provide indications of successful or failing writes 132 to MCU 120, in some embodiments. MC 130 may be implemented as a hardware controller for performing writes, reads, and other operations to provide access to non-volatile memor(ies) 140 without MCU 120. In this way, the performance characteristics of the hardware controller for processing access requests may be fully leveraged, allowing other management operations for non-volatile memories to be handled in MCU 120, which may implement a processor and firmware/software as discussed in detail below with regard to FIG. 2, to handle complex decision-making without introducing the latency that may be incurred with such capabilities into the read/write path for access requests.

As discussed in more detail below with regard to FIGS. 2, 4, 5, and 6, MCU 120 may perform various management operations, including the management of migration events, for non-volatile memor(ies) 140, without directly processing host access requests for non-volatile memor(ies) 140, in some embodiments. For example, wear-leveling schemes may be implemented to select different storage locations (e.g., pages, blocks, bytes, etc.) within non-volatile memor(ies) 140 for migration in order to distribute writes evenly across storage locations and prolong the usable life of a storage location. In some embodiments, MCU 120 may assist MC 130 in performing migrations in response to failed write requests, by selecting a different storage location in non-volatile memor(ies) 140 to receive the write. For such migration events, MCU 120 may provide instructions or requests 134 to perform writes to move the data to the different storage location to MC 130, in various embodiments.

Non-volatile memor(ies) 140 may be various kinds of persistent memory storage that can be byte addressable and/or block addressable. Non-volatile memories may include flash-based memory technologies such as NAND or NOR flash memory. In at least some embodiments, non-volatile memor(ies) 140 may include storage class memory, which may include non-volatile memory technologies such as resistive random access memory (ReRAM), phase-change memory (PCM), or conductive-bridging random access memory (CBRAM), which may allow for larger storage capacity with lower cost than volatile memory technologies, such as static random access memory (SRAM) or dynamic random access memory (DRAM), and with faster access times/speeds than block-based persistent storage (e.g., such as hard disk drives) or flash-based memory technologies, like NAND).

Please note that the previous description of host processor 110, access device 102, interface(s) 104, interconnect 106, MCU 120, MC 130, and/or non-volatile memor(ies) 140 are merely provided as an examples of a microcontroller for managing migration events performed by a separate memory controller and write failure handling at a memory controller for non-volatile memory. Different numbers of components or configuration of components may be implemented. For example, multiple host processors may connect to a single access device or multiple access devices that provide separate access channels to different groups of non-volatile memories to one or more host processors may be implemented.

This specification begins with general descriptions of a microcontroller, which may manage migration events performed by a separate memory controller, and of a memory controller which may implement write failure handling for non-volatile memory. Various examples of different components/modules, or arrangements of components/modules that may be implemented in the microcontroller and memory controller may then be discussed. A number of different methods and techniques to implement a microcontroller for managing migration events performed by a separate memory controller and write failure handling at a memory controller for non-volatile memory are then discussed, some of which are illustrated in accompanying flowcharts. Various examples are provided throughout the specification.

Figure 2:
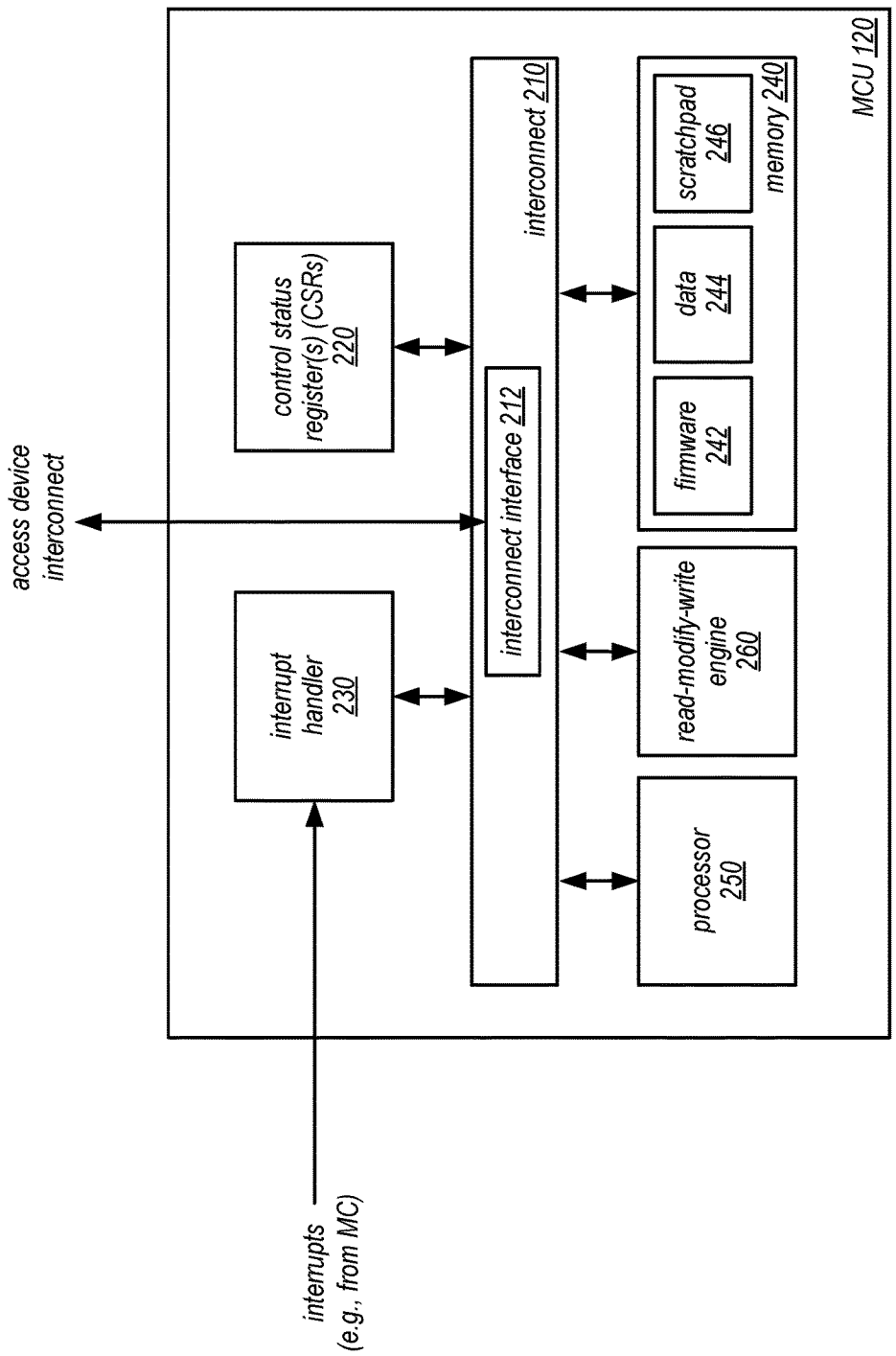
FIG. 2 is a logical block diagram illustrating a microcontroller for a non-volatile memory, according to some embodiments.

FIG. 2 is a logical block diagram illustrating a microcontroller for a non-volatile memory, according to some embodiments. MCU 120 may implement interconnect 210. Similar to interconnect 106 discussed above with regard to FIG. 1, interconnect 210 may implement one of many different kinds of bus architectures, such as an AXI fabric. Interconnect 210 may also implement interconnect interface 212, which may include the various components to act as slave, master, or other role for communicating with the access device interconnect 106, in some embodiments.

In some embodiments, MCU 120 may implement interrupt handler 230. Interrupt handler 230 may receive interrupt signals from various access device components, such as MC 130, which may indicate various conditions, scenarios, or other information. For example, as discussed below with regard to FIG. 5B, an interrupt may be received to indicate that a write operation failed to complete successfully at MC 130, which may trigger a migration event to be managed by MCU 120. Similarly, MCU 120 may implement control status register(s) (CSRs) 220 for communicating various information with other components of access device 102 (e.g., MC 130) or within MCU 120 (e.g., read-modify-write engine 260), in some embodiments.

In some embodiments, MCU 120 may implement processor 250. Processor 250 may execute or perform firmware 242 (or other software) in memory 240, access data 244 as part of the performance of firmware 242, and/or load different instructions or data from scratchpad 246. In some embodiments, firmware 242, data 244, and scratchpad may be implemented on individual memory components 240 (which may be various kinds of volatile or non-volatile memory devices). Firmware 242 may include instructions to perform various management operations. For example, migration event handling as discussed below with regard to FIGS. 3-7 may be implemented as part of firmware 242 (e.g., including instructions to implement wear-leveling schemes and destination location selection for failed writes). Read-modify-write engine 260 may be implemented in various embodiments, to generate and send read, write, and other requests to MC 130 (e.g., directing MC 130 to perform writes to copy data to a different storage location as part of a migration event).

Figure 3:
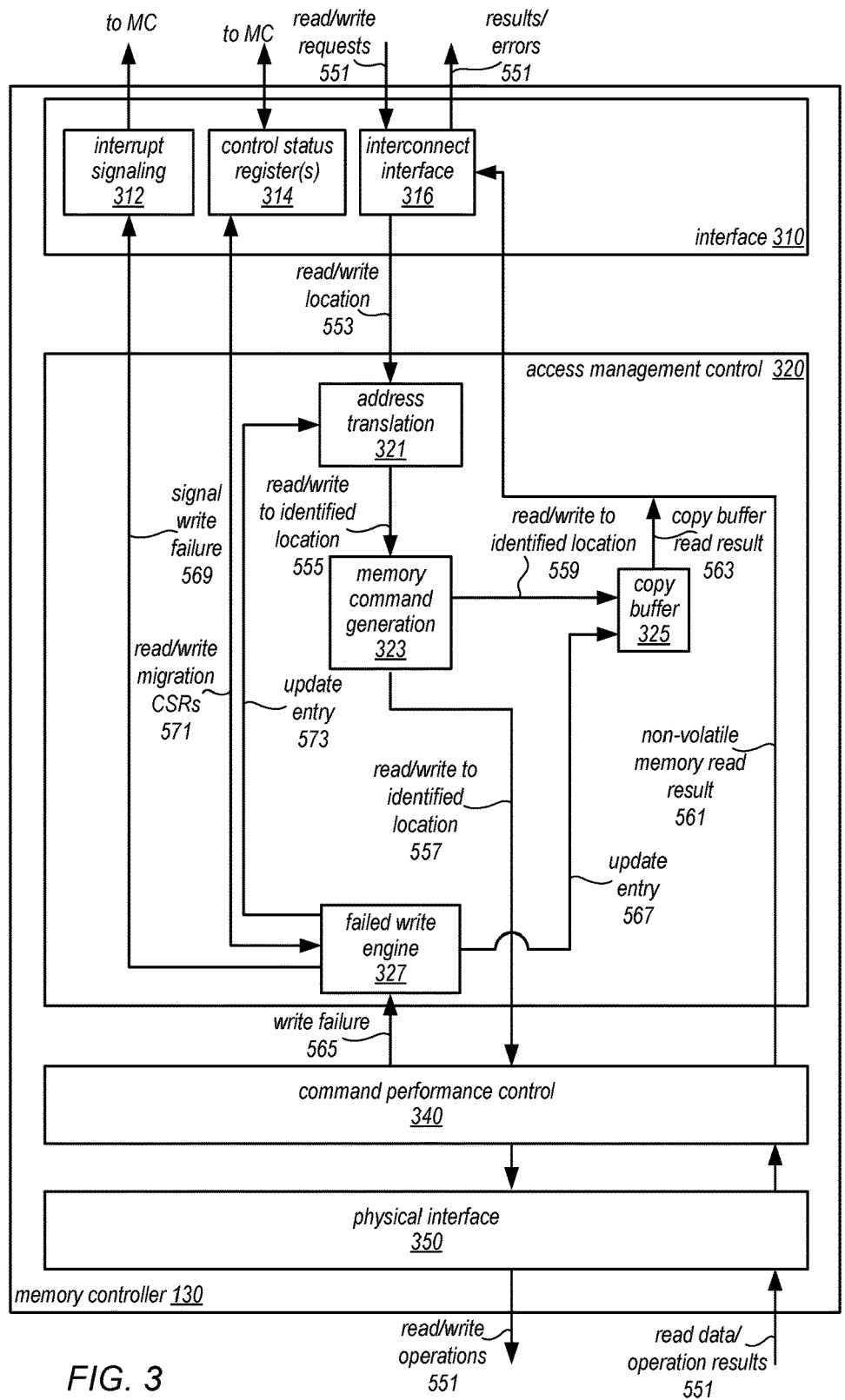
FIG. 3 is a logical block diagram illustrating a memory controller for a non-volatile memory, according to some embodiments.

FIG. 3 is a logical block diagram illustrating a memory controller for a non-volatile memory, according to some embodiments. Memory controller 130 may be a hardware controller for non-volatile memory, in various embodiments. Memory controller may implement interface 310 to facilitate different interactions with MC 130. For example, interface 310 may implement interrupt signaling 312 to generate and send interrupt signals from MC 130 to MCU 120, such as interrupts signaling a failed write at MC 130. Interface 310 may implement control status register(s) (CSRs) 314 which may communicate various information to MCU 120. For example, CSRs may include, but are not limited to the copy buffer assignment CSR, copy buffer status CSR, a migration allocation limit CSR, migration destination CSR, migration done CSR, migration status CSR, address translation clear CSR, and failed write status CSR. Different components of MC 130, such as failed write engine 327, may write to or obtain data from CSRs 314 to perform various operations.

Interface 310 may implement interconnect interface 316, in various embodiments, to handle access requests received from a host processor or MCU 120, in some embodiments. For example, interconnect interface 316 may implement request and data buffers for reads and writes as well as arbitration components for providing access to them (e.g., using a round-robin access distribution scheme). Interconnect interface 316 may implement transaction or request selection ordering and/or reordering control logic to initiate the generation of memory commands to be performed, in some embodiments. Interconnect interface 316 may implement response control logic for handling responses to access requests received from command performance control 210, as well as for write responses, in some embodiments.

MC 130 may implement access management control 320 to perform high-level control operations for interacting with non-volatile memory, in various embodiments. For example, read/write requests 551 that are received via interconnect interface 316 may be checked at address translation 321 in various embodiments. For some reads or writes, the location 553 of the write request may be a physical location (e.g., a physical address in a non-volatile memory), so no address translation at 321 may be applied. In scenarios where the read/write location 553 is directed to a storage location undergoing a migration (e.g., due to a failed write or wear-leveling migration), subsequent reads or writes to the storage location may be temporarily directed to a new location during the migration (e.g., in copy buffer 325 or a new storage location in non-volatile memory for which a memory management unit (MMU) has not been updated to identify in place the storage location). Address translation 321 may identify the new location, in various embodiments. In this way, reads and writes may continue while migration is being performed, so that a migration operation does not block access to a storage location during the migration.

Address translation 321 may be implemented as a table, in some embodiments, with fields indicating whether an entry in the table is valid, source storage location (which may be the original location of the page, block being migrated), destination storage location (which can be an address in non-volatile memory or copy buffer 325), and type of destination storage location (e.g., copy buffer 325 or non-volatile memory location). New entries may be added to address translation 321 (e.g., by failed write engine 327) when a migration is performed for a storage location. When a migration has been successfully performed to non-volatile memory, a destination location update request may be sent to address translation 321. The request may contain the source location and the destination location for the migration. Control logic at address translation 321 may compare the source location to the location field for all valid table entries using a CAM operation, in some embodiments. The destination location field of found matching entry may be updated with the destination location from the update request and the type field may be cleared, in some embodiments. In this way, if a request for the source storage location is received, address translation 321 may direct the request to the destination location in non-volatile memory. Once an update to an MMU is performed to map the source storage location to the destination storage location, failed write engine 327 may send a request to address translation 321 to delete the entry for the source storage location, in some embodiments.

Once the proper location for the read/write request is identified 555 at address translation 321, then the location may be provided to memory command generation 323. Memory command generation 323 may generate the non-volatile memory command for reads/writes 557 if the identified storage location is in non-volatile memory or may generate/perform commands to write/read 559 an identified location, an identified entry, in copy buffer 325, in some embodiments.

Copy buffer 325 may be implemented, in various embodiments, to store data undergoing migration from one storage location to another. In this way, the data can still be accessible to writes or reads directed to the data (even though the data may not be in the location originally specified in the read/write request. Copy buffer 325 may be divided into blocks or other sub-sections that provide storage for individual data. The number of blocks, and thus the number of ongoing migrations may be limited in some embodiments according to a limit described in a migration allocation limit CSR (which may be programmed by MCU 120). In some embodiments, each block of copy buffer 325 may include metadata that describes whether a block is free or in use, the source location of data stored in the block, the destination location of the data stored in the block, and the status of the operation to move the data block (e.g., success or fail), in some embodiments. The block may include a valid field and a dirty field (e.g., indicating that the data has changed from when it was first read, sent or obtained), which may indicate whether the data in copy buffer block should be returned for a read request, as discussed below with regard to FIG. 9. A copy buffer block may be allocated or written to by failed write engine 327, in some embodiments, in order to store data for a detected write failure.

Successful reads to copy buffer 325 may return results 563 from copy buffer 325 via interconnect interface 316, in some embodiments. Similarly, data from successful reads to non-volatile storage 561 may be returned via interconnect interface 316, in some embodiments. For successful writes to copy buffer, the block description information may be set with the valid and dirty fields to "1" to indicate that the data is valid and that the data is different from the data that is stored non-volatile memory.

Failed write engine 327 may perform operations to handle failed writes and/or writes to perform a migration (e.g., for wear leveling selections made by MCU 120). For example, failed write engine 327 may poll for or otherwise obtain error or status information for a write operation (e.g., by sending a command to read an error mode register for a location in non-volatile memory to determine whether the write failed or succeeded). Failed write engine 327 may signal interrupts of failed writes via interrupt signaling 312 to MCU 120. Failed write engine 327 may write a copy of the data to be migrated to copy buffer 325 (as well as perform other copy buffer block description initialization to description fields). Failed write engine 327 may update or delete entries from address translation 321 as new failed writes are detected (or writes performed for other migration events).

Failed write engine 327 may read or write 571 to different control status registers to perform writes for migration events indicated by MCU 120 via control status registers (e.g., wear-leveling selections). In some embodiments, failed write engine 327 may perform operations in response to values or information received via a CSR. For example, for migration events triggered at MCU to perform wear leveling (as discussed below with regard to FIG. 5A), failed write engine may detect a write or change to a copy buffer assignment CSR. The write to the copy buffer assignment CSR may act as a request from the MCU 120 to obtain a copy buffer entry in order to perform a migration for wear leveling. Failed write engine 327 may check whether an entry in copy buffer 325 is available to store data for a migration. If there is no free entry, then failed write engine 327 may write a copy buffer status CSR to indicate that copy buffer assignment for the MCU 120 failed. If there is a free copy buffer entry, then failed write engine 327 may determine whether an address translation entry in address translation 321 is free. If there is no free entry in address translation 321, then failed write engine 327 may write a copy buffer status CSR to indicate that copy buffer assignment for the MCU 120 failed (as an address translation entry would be used to redirect reads and writes to the copy buffer entry if used). If an address translation entry is free in addition to a copy buffer entry, then failed write engine 327 may write a migration source location to the free entry in the translation buffer, data from the source location into the free entry of the copy buffer, and a destination location to point to the free entry in the copy buffer. Then, failed write engine 327 may update a copy buffer status CSR to indicate that the copy buffer assignment request (indicated by copy buffer assignment CSR) was successful and provide the location of the free entry in the copy buffer (e.g., an entry number, slot, etc.). In another example of a CSR that triggers an action performed by failed write engine 327, a write to a migration destination CSR may identify an entry in the copy buffer 325 to write a destination address selected by MCU 120.

Another example of a CSR that triggers an action performed by failed write engine 327 is a write to a migration done CSR. Failed write engine 327 may check to see if the operation to write the data failed (e.g., in the migration operation status field) in the block description for the copy buffer entry identified in the migration done CSR. If a failure is indicated then, failed write engine 327 may write a migration failure indication in migration status CSR and clear the migration status field to indicate no failure (e.g., set to "0") in the copy buffer entry. If the operation to write the data did not fail, then failed write engine 327 may check to see if a dirty field is set for the entry. If yes, then failed write engine 327 may set migration failed to indicate a dirty value in migration status CSR and clear the migration status field to indicate no failure (e.g., set to "0") in the copy buffer entry. If no operation failure or dirty data is indicated, then failed write engine 327 may indicate in a write to migration done status CSR that the migration succeeded. In another example of a CSR that triggers an action performed by failed write engine 327 is a write to an address translation clear CSR. Failed write engine 327 may locate an entry in address translation 321 with a source location and failed write location for the identified migration and clear the entry.

MC 130 may implement command performance control 340 in various embodiments, to provide low-level control functions and logic for processing access requests to non-volatile memory. For example, command performance control 340 may converts commands received from access management control 320 into the signaling that conforms to the specification of the non-volatile memory which may be transmitted via physical interface 350 to non-volatile memory. Command performance control 340 may enforce timing specifications at physical interface 350. For instance, command performance control 340 may synchronize or otherwise operation according to a non-volatile memory clock frequency (which may be also synchronous with a main clock for MC 130), in some embodiments. Command performance control 210 may perform memory training and initialization operations, in some embodiments. MC 130 may implement physical interface 350 to provide the physical connection to non-volatile memory via which requests and results/errors may be received.

The examples of a microcontroller for managing migration events performed by a separate memory controller and write failure handling at a memory controller for non-volatile memory as discussed above with regard to FIGS. 1-3 have been given in regard to an example access device. Note that various other types or configurations of host devices or systems, access devices, or non-volatile memory may implement a microcontroller for managing migration events performed by a separate memory controller and write failure handling at a memory controller for non-volatile memory and thus may implement these techniques. In addition to examples given above, the techniques discussed below with regard to FIGS. 4-9 may be also implemented using the various components discussed above as well as different types of systems or devices that provide access to non-volatile memory.

Figure 4:
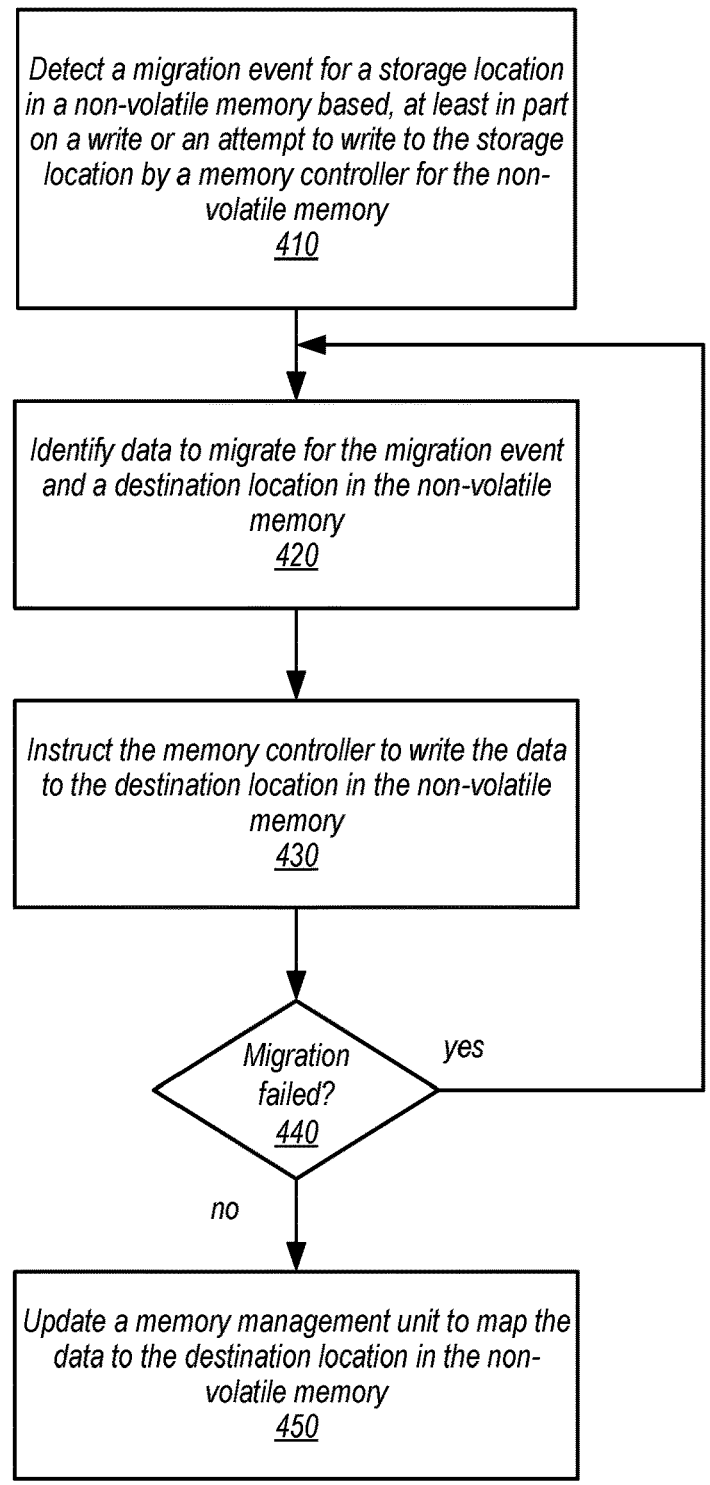
FIG. 4 is a high-level flowchart illustrating various methods and techniques to implement a microcontroller for managing migration events performed by a separate memory controller, according to some embodiments.

FIG. 4 is a high-level flowchart illustrating various methods and techniques to implement a microcontroller for managing migration events performed by a separate memory controller, according to some embodiments. As indicated at 410, a migration event may be detected at a microcontroller for a storage location in a non-volatile memory based, at least in part, on a write or an attempt to write to the storage location by a memory controller for the non-volatile memory, in various embodiments. A migration event may be an event that causes or attempts move data (e.g., a block of data, a page of data, etc.) from one storage location (e.g., one address) to another location. Migration events may be detected in order to process access requests, such as in the event of a write failure to the storage location (e.g., an attempt to write to the storage location), in some embodiments, as discussed below with regard to FIG. 5B. In some embodiments, management operations, such as wear leveling (e.g., selecting to migrate data from the storage location according to a write count of writes to the storage location), for a non-volatile memory may trigger a migration event, as discussed below with regard to FIG. 5A.

As indicated at 420, data to migrate for the migration event and a destination location in the non-volatile memory may be identified, in various embodiments. The data to move may be identified according to the type of migration event, in various embodiments. For example, if the type of the migration event were a management type of migration event (e.g., like wear leveling), then the data in the storage location to be migrated from its current storage location would be the identified data. For migration events triggered by write or other data modification operations, the identified data may be the data to be written/modified at the storage location. The destination location may be selected based on availability, likelihood of write failures, or various other criteria which may be evaluated by the microcontroller.

As indicated at 430, the memory controller may be instructed to write the data to the destination location in the non-volatile memory, in some embodiments. For example, as discussed above with regard to FIG. 3, various CSR status register(s) may be written to by the microcontroller to identify which storage location has been selected for migration. A write request (e.g., via a DMA interface to the memory controller) may be sent to perform a write according to the information specified in the CSR status register(s). For example, a CSR may indicate a copy buffer entry in which the data to be migrated to a destination location resides.

In some embodiments, the memory controller can delay or deny the microcontroller's migration. For example, for a memory controller that allows reads or writes to data during migration and utilizes a copy buffer and address translation as discussed above with regard to FIG. 3, performance of a migration event may be delayed until both a copy buffer entry to store data undergoing migration and translation address entry to point to the entry in the copy buffer are available. The microcontroller may periodically retry denied migration operations, in some embodiments.

As indicated at 440, a determination of whether the migration succeeded may be performed, as discussed in detail below with regard to FIG. 6. If migration fails, then the migration operation may be retried (either to the same location or a different location depending upon the type of failure). If a failure did not occur, then as indicated at 450 a memory management unit may be updated to map the data to the destination location in the non-volatile memory. For example, a memory management unit maintained as part of a host processor may be updated by one or more indications, messages, or other communications from the microprocessor to the host processor. In some embodiments, a memory management unit implemented as part of an access device, like access device 102 in FIG. 1, may be updated (e.g., by performing a write or other operation to change the mapping).

Figure 5A:
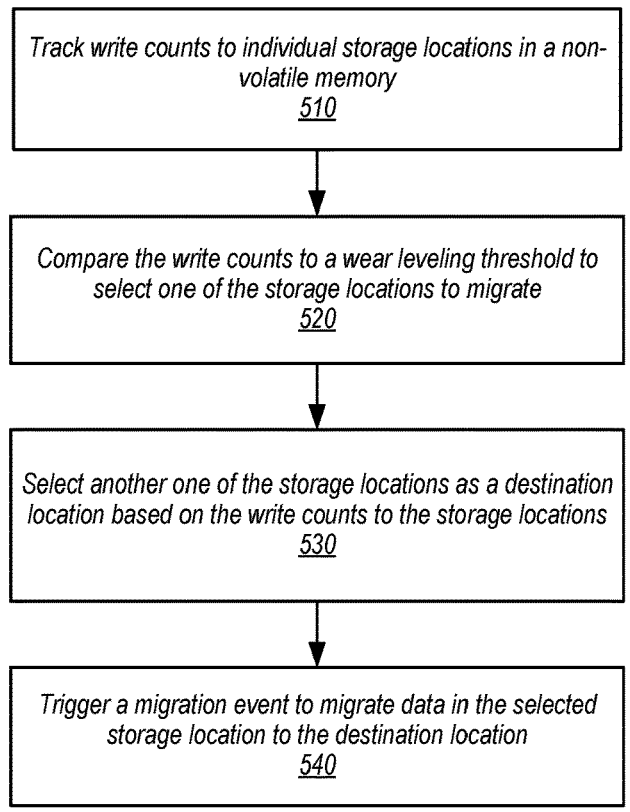
FIGS. 5A and 5B are high-level flowcharts illustrating various methods and techniques to implement detecting migration events, according to some embodiments.

FIG. 5A is a high-level flowchart illustrating various methods and techniques to implement detecting a migration event for wear leveling, according to some embodiments. As indicated at 510, write counts to individual storage locations in a non-volatile memory may be tracked. For example, the memory controller may send indications of successful writes (and attempted/failed writes) to the microcontroller which may add the writes to the count of writes. Other writes that may be instigated by the microcontroller (e.g., for management purposes, such as refresh operations), may be included in the write counts as well. As indicated at 520, the write counts may be compared with a wear leveling threshold to select one of the storage locations to migrate, in some embodiments. For example, a threshold value may be applied and storage location with the highest write count in excess of the threshold value may be identified.

As indicated at 530, another one of the storage locations may be selected as a destination location based on the write counts to the storage locations, as indicated at 530. For example, storage locations that are both available to store data and low in terms of write count may be selected over other free storage locations with higher write counts. As indicated at 540, a migration event may be triggered to migrate data in the selected storage location to the destination location, in some embodiments. As noted above, in embodiments of a memory controller that allow reads and writes to data being migrated, the triggered migration event may direct, instruct, or cause the memory controller to write a copy of the data in the selected storage location into an entry in the copy buffer. Other memory controller components, such as address translation, may also be updated so that reads or writes to the selected storage location are redirected to the copy buffer entry, in some embodiments.

Figure 5B:
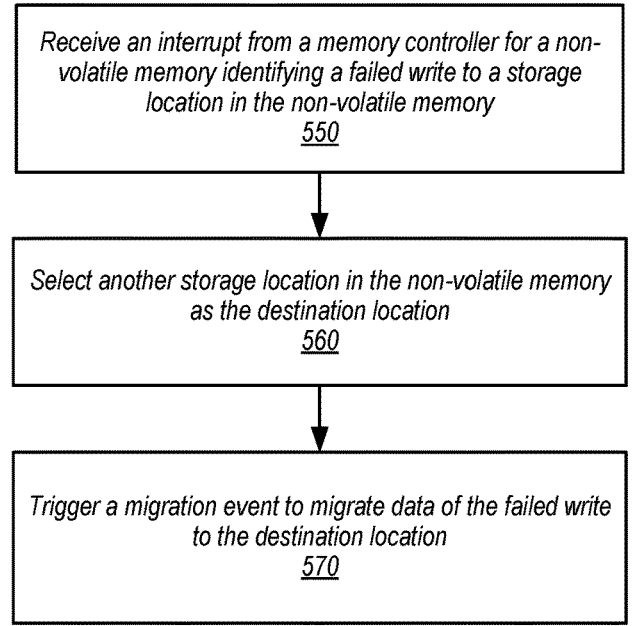

FIG. 5B is a high-level flowchart illustrating various methods and techniques to implement detecting a migration event for failed writes at a memory controller, according to some embodiments. As indicated at 550, an interrupt may be received from a memory controller for a non-volatile memory identifying a failed write to a storage location in the non-volatile memory, in some embodiments. For instance, as discussed above with regard to FIG. 3, a failed write engine 327 or other memory controller component may detect that a write operation was not successful and trigger an interrupt signal that indicates a write failed. As indicated at 560, another storage location in the non-volatile memory may be selected as the destination location, in some embodiments. For example, a free location list may be maintained which may be used to select the next location to use. A failed location list (e.g., of storage locations where failed writes have occurred), may be maintained to avoid selecting those locations even if they are available. As indicated at 570, a migration event may be triggered to migrate data of the failed write to the destination location, in some embodiments. For example, an instruction may be sent to the memory controller to perform a direct memory access operation to copy data from an entry in the copy buffer (which the memory controller may have identified to the microcontroller via a CSR) to the selected destination location.

Figure 6:
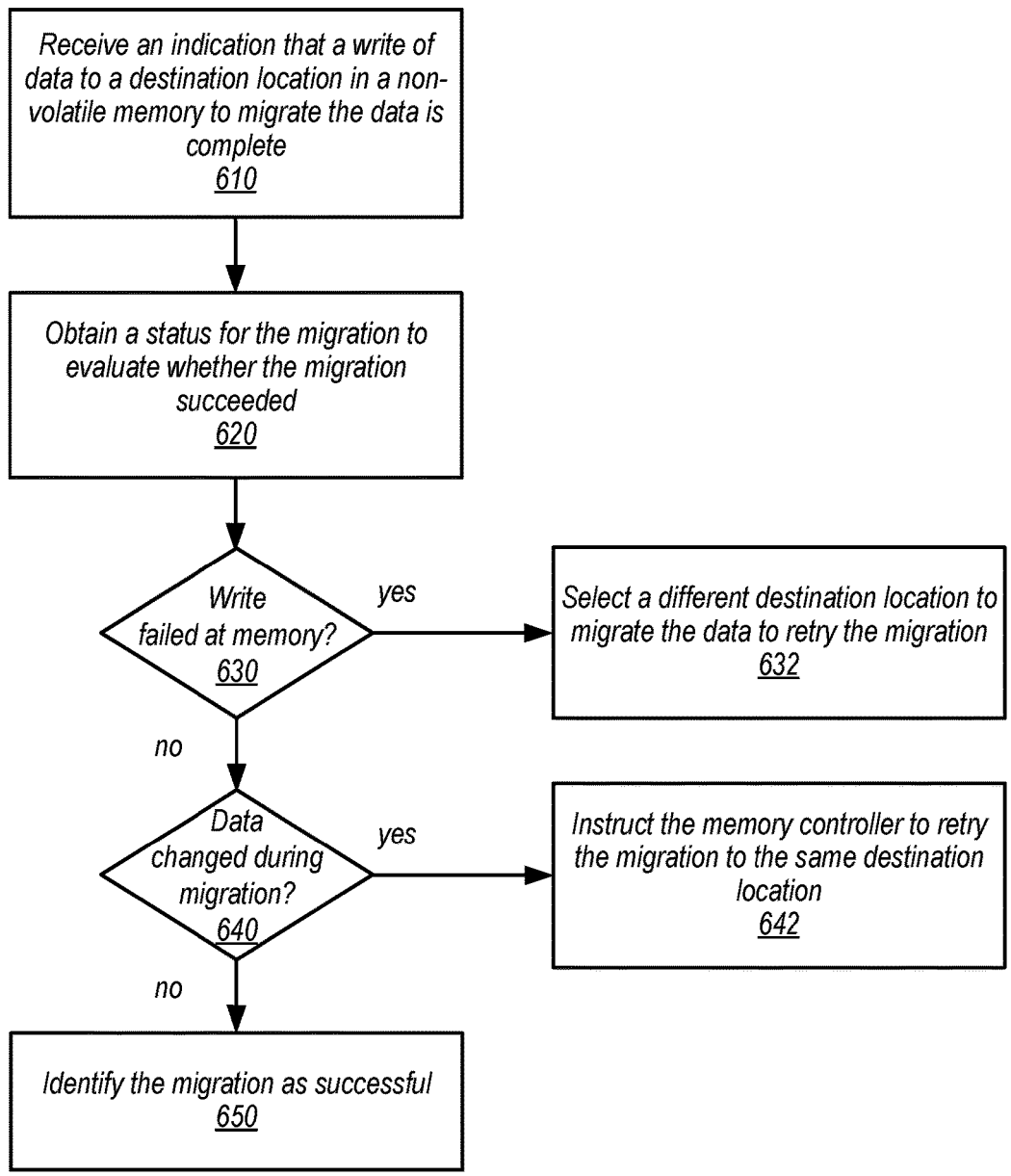
FIG. 6 is a high-level flowchart illustrating various methods and techniques to implement a microcontroller for managing migration events performed by a separate memory controller, according to some embodiments.

FIG. 6 is a high-level flowchart illustrating various methods and techniques to implement a microcontroller for managing migration events performed by a separate memory controller, according to some embodiments. As indicated at 610, an indication that a write of data to a destination location in a non-volatile memory to migrate is complete may be received, in some embodiments. For example, an interrupt (e.g., as may be triggered by a DMA engine) may signal completion of the operation to copy the data to the destination location. As indicated at 620 a status for the migration may be obtained to evaluate whether the migration succeeded, in some embodiments. For example, the memory controller may write migration status information to a CSR which the microcontroller can access in order to evaluate the success or failure of the migration.

For example, as indicated at 630, the status for the migration information may indicate that the migration failed due to a failure of the non-volatile memory to perform the write operation successfully (e.g., resulting in data corruption or other errors in the content of the data stored at the storage location in non-volatile memory). If the status indicates a write failure at the non-volatile memory, then as indicated at 632 a different destination location may be selected to migrate the data to retry the migration, in some embodiments. For example, another location in an available list may be selected. In some embodiments, the storage location of the failed write may be added to a list of failed storage locations which are avoided when selecting locations to perform a migration.

As indicated at 640, another migration failure that can be indicated by the status may be a failure indicating that the data was changed during the migration. For example, as the memory controller may allow writes to the data in the copy buffer via the pointer to the copy buffer entry in the address translation entry, a write operation may be performed on the data in the copy buffer prior to migration of the data (or after the migration of the data but before the entries are removed from the address translation table, copy buffer, and update to the MMU are complete which would direct the operation to the new location). As indicated at 642, the memory controller may retry the migration to the same location, copying the changed data to the destination location, in some embodiments. The status CSR may be cleared, in some embodiments, so that if the migration of the changed data succeeds and no intervening write occurs, the migration may be identified as successful (and the entries in the copy buffer, address translation table, and MMU changed so that writes are directed to the destination location).

If no errors are detected, then the migration may be identified as successful, as indicated at 650. A CSR for the migration may be cleared, MMU updated, and entries in the address translation table and copy buffer cleared for storing other data for other migrations.

Figure 7:
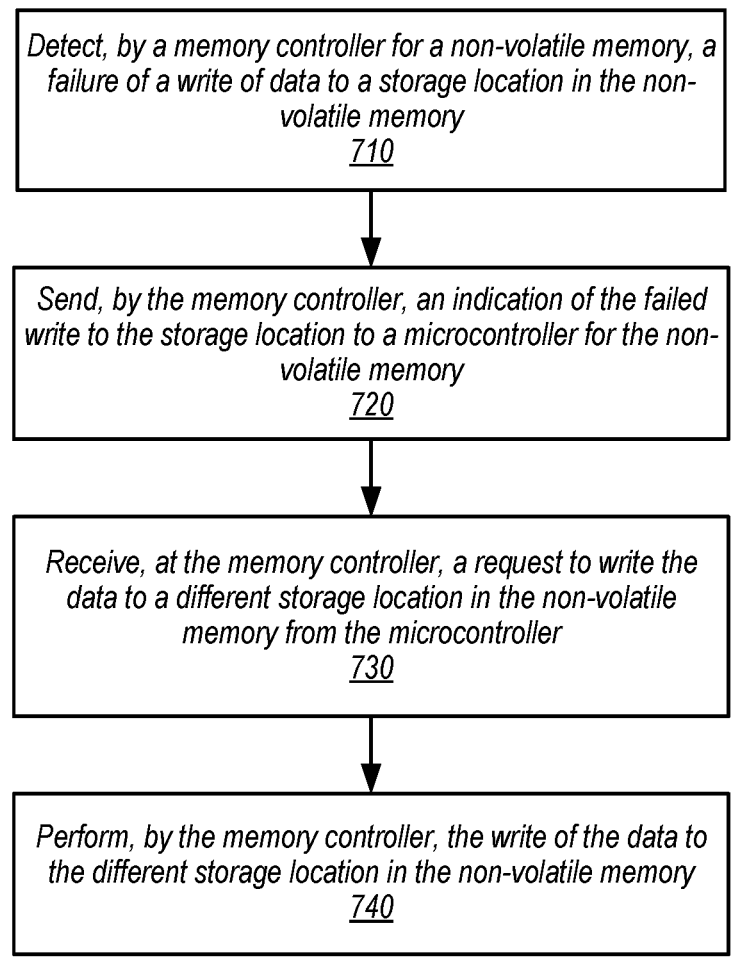
FIG. 7 is a high-level flowchart illustrating various methods and techniques to implement write failure handling at a memory controller for non-volatile memory, according to some embodiments.

FIG. 7 is a high-level flowchart illustrating various methods and techniques to implement write failure handling at a memory controller for non-volatile memory, according to some embodiments. As indicated at 710, a failure of a write of data to a storage location in a non-volatile memory may be detected by a memory controller, in some embodiments. For example, error modes, status information, or other acknowledgements or response from the non-volatile memory may be received and evaluated with respect to failure conditions or criteria. As indicated at 720, an indication of the failed write may be sent to the storage location to a microcontroller for the non-volatile memory, in some embodiments. An interrupt, or other signal, may be sent directly from the memory controller to the microcontroller to indicate the failure. In some embodiments, the failure indication may identify the location of the data that was to be written (e.g., in a pending write buffer or other buffer like copy buffer 325 in FIG. 3 above). In some embodiments, the failure indication may identify the storage location (e.g., address) of the write that failed.

As indicated at 730, a request to write the data to a different storage location in the non-volatile memory from the microcontroller may be received at the memory controller, in some embodiments. For example, the instruction may be received via a CSR and/or interface command (e.g., a DMA command sent via an interconnect connecting both the memory controller and the microcontroller). In some embodiments, the instruction may specify a different location in the non-volatile memory to write the data. As indicated at 740, the write of the data to the different storage location in the non-volatile memory may be performed by the memory controller in some embodiments. For instance, the memory controller may generate commands or other operations to be sent via a physical interface to the non-volatile device to perform the write of the data the identified location.

Figure 8:
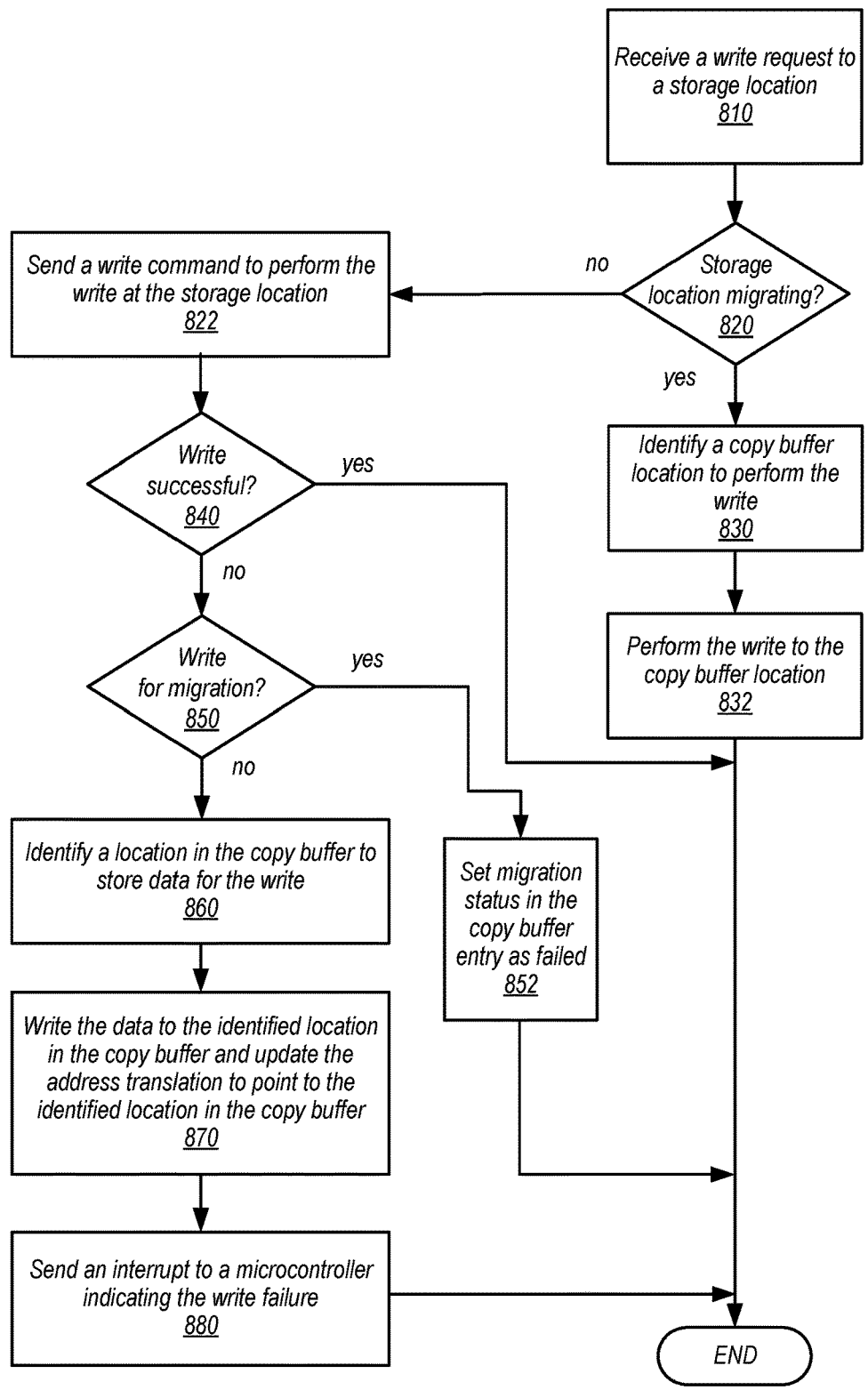
FIG. 8 is a high-level flowchart illustrating various methods and techniques to implement processing write requests at a memory controller that allows writes to migrating data, according to some embodiments.

FIG. 8 is a high-level flowchart illustrating various methods and techniques to implement processing write requests at a memory controller that allows writes to migrating data, according to some embodiments. As indicated at 810, a write request to a storage location may be received, in some embodiments. A determination may be made as to whether the storage location is being migrated, as indicated at 820 (e.g., the data in the storage location or the data to be written to the storage location). For example, an address translation table, or other mapping structure, may be implemented to identify whether a given storage location is being migrated or not. If no record or entry for the storage location is present, then the location may not be migrating, in some embodiments.

If the storage location is being migrated, as indicated by the positive exit from 820, then a location in a copy buffer may be identified to perform the write, as indicated at 830, in some embodiments. For example, the address translation table may point to a location in the copy buffer. As indicated at 832, the write may then be performed to the copy buffer location, in some embodiments.

As indicated by the negative exit from 820, the storage location may not be migrating. A write command may be send to the non-volatile memory to perform the write at the storage location, as indicated 822, in some embodiments. If the write is not successful, as indicated by the negative exit from 840, then a determination may be made as to whether the write was performed for a migration event or in response to a host request, as indicated at 850. For example, a scan or evaluation of migration destination instructions, registers, tables, or other structures may be performed to determine if the storage location is a match. If the storage location is a match, then the write is a migration. For migration writes, the migration status in the copy buffer entry for the write may be set as failed, as indicated at 852. In this way, a new copy buffer entry is not obtained for data that already exists in a copy buffer. The microcontroller may detect the failure of the migration according to the migration status indicated in copy buffer, as discussed above with regard to FIG. 6, in some embodiments.

If the write is not for a migration event, then as indicated at 860, a location in the copy buffer may be identified to store data for the write, in some embodiments. For example, a list of available entries may be checked or otherwise evaluated to see an entry exists or a list of entries that may be scanned until an entry marked invalid is identified. Once identified, the data may be written to the location in the copy buffer and update made to the address translation to point to the location in the copy buffer, as indicated at 870. As indicated at 880, an interrupt indicating the write failure may be sent to microcontroller, in some embodiments.

Figure 9:
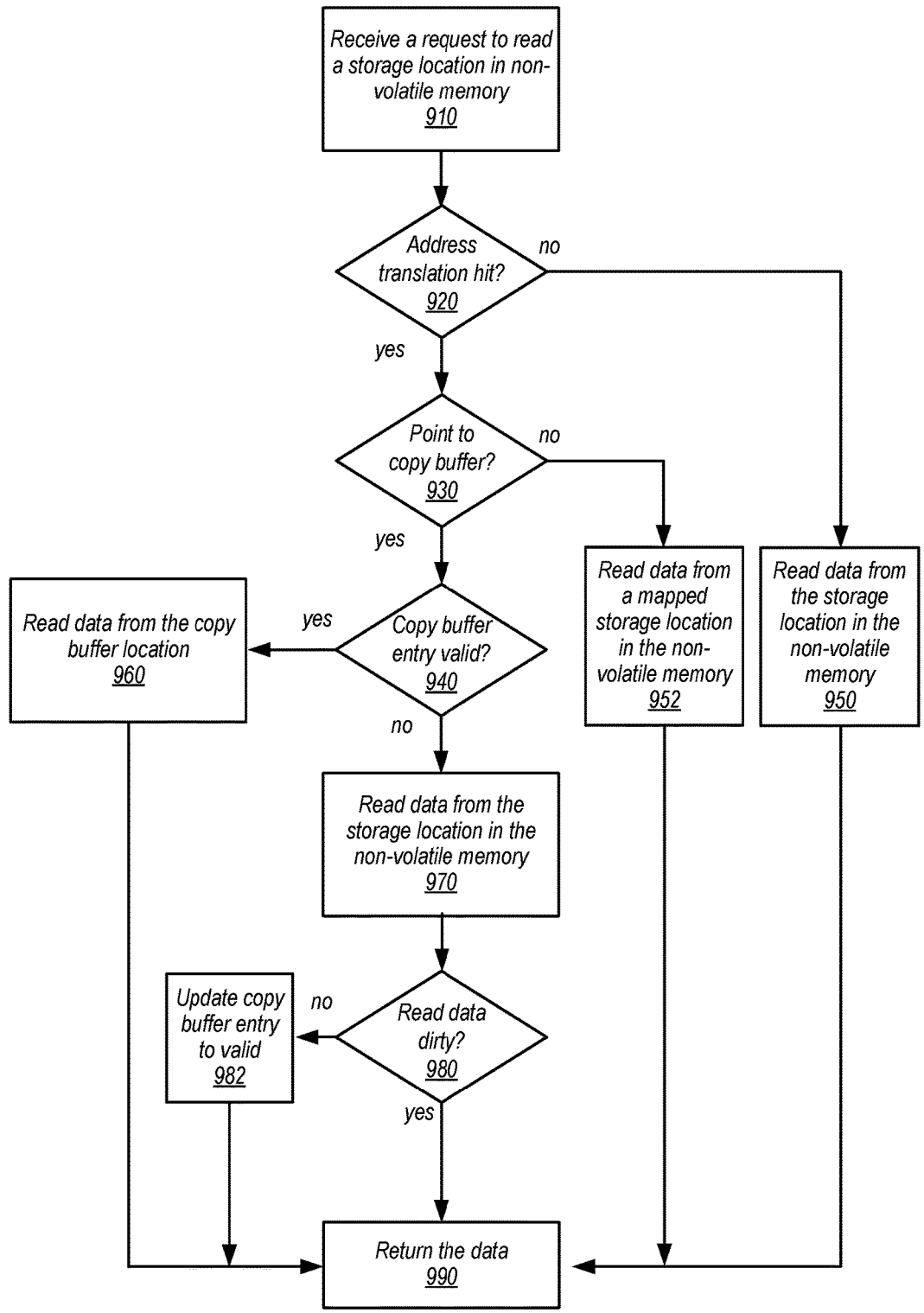
FIG. 9 is a high-level flowchart illustrating various methods and techniques to implement processing write requests at a memory controller that allows reads to migrating data, according to some embodiments.

FIG. 9 is a high-level flowchart illustrating various methods and techniques to implement processing write requests at a memory controller that allows reads to migrating data, according to some embodiments. As indicated at 910, a request may be received at a memory controller to read a storage location in a non-volatile memory, in some embodiments. If, as indicated by the negative exit from 920, there is not a hit on the address translation table, then the data may be read from the identified storage location in the non-volatile memory, as indicated at 950, and returned 990. If there is a hit but the entry in the address translation table does not point to a copy buffer entry, as indicated by the negative exit from 930, then the data may be read from the mapped storage location in the non-volatile memory identified in the address translation table entry, as indicated at 952, and returned 990.

If the address translation table entry does point to a copy buffer entry and that entry is valid (as may be determined by a valid field or setting for the entry), as indicated by the positive exit from 940, then the data may be read from the location in the copy buffer, as indicated at 960 and returned 990. If the copy buffer entry is not valid, as indicated by the negative exit from 940, then the data may be read from the storage location in the non-volatile memory, as indicated at 970. If the read data indicates that it is "dirty," then the read data may be returned, as indicated by the positive exit from 980. "Dirty" data may be identified by a dirty bit, field, value, or marker that indicates that the data read from the storage location in non-volatile memory has been updated to match a copy of the data in the copy buffer entry (which has not yet been marked as valid in the copy buffer entry). If the data is not dirty, then as indicated at 982, the copy buffer entry may be marked as valid so that a next read may read from the copy buffer instead of the memory. The not "dirty" data may then be returned, as indicated at 990.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Figure 10:
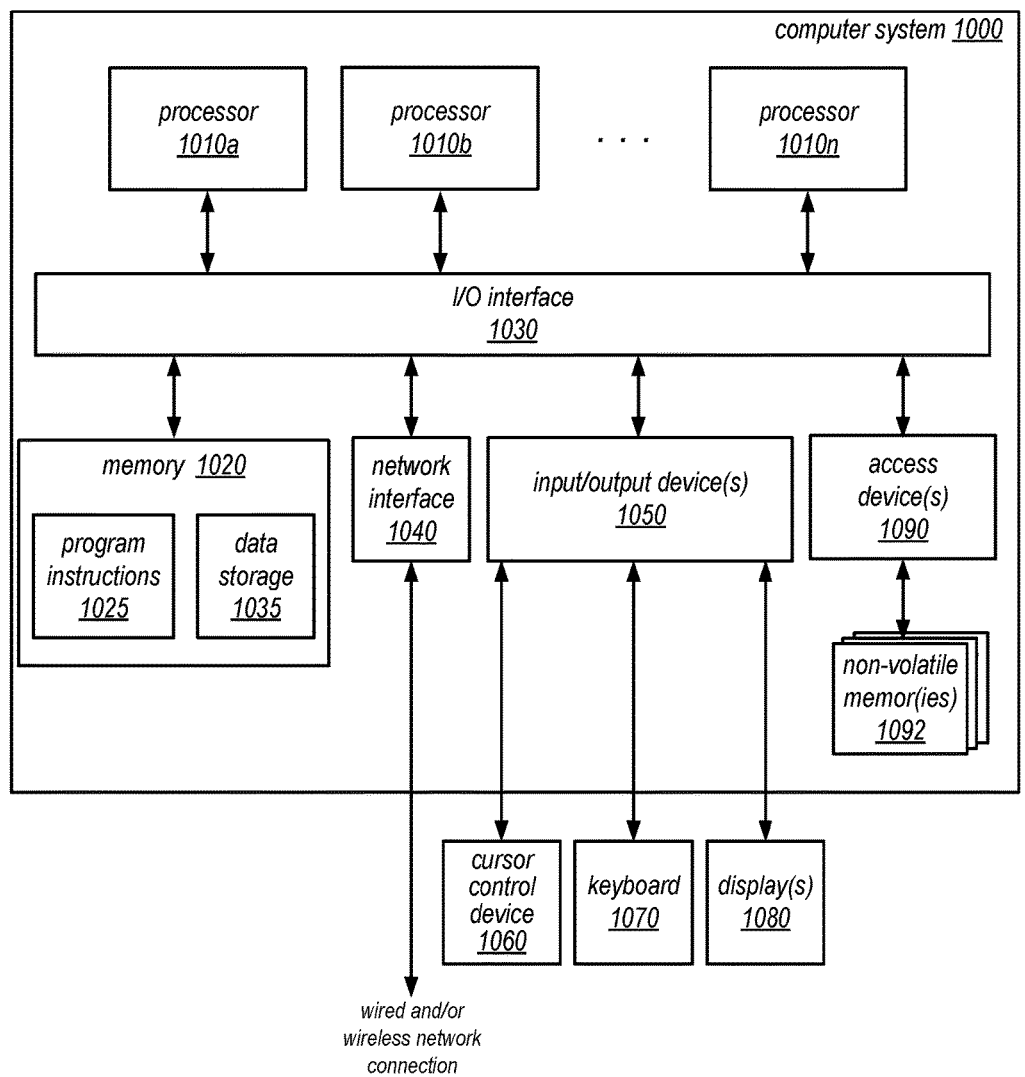
FIG. 10 is an example computer system, according to some embodiments.

Embodiments of a host system which may include or interact with an access device, microcontroller, and/or memory controller as discussed above may be implemented as part of a computer system. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 may include one or more access device(s) 1090 (e.g., similar to access device 102 discussed above with regard to FIG. 1) which may provide processors 1010 an access channel to one or more non-volatile memor (ies) 1092, in some embodiments. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 2000 or may be distributed on various nodes of computer system 2000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that may implement the various computing resources as described herein for a host system, and data storage 1035, comprising various data accessible by program instructions 1025. In one embodiment, program instructions 1025 may include software elements of embodiments of a host (e.g., a hypervisor implementing a virtualization platform, container-based virtualization, or other hosting platforms for computing resources) as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
an access device for a non-volatile memory that provides a host processor with access to the non-volatile memory, the access device comprising a microcontroller and a memory controller;
wherein the memory controller is configured to:
receive a request to write data to a storage location in the non-volatile memory from the host processor;
send a command to the non-volatile memory device to write the data to the storage location in the non-volatile memory;
evaluate a command result to determine that the write to the storage location in the non-volatile memory failed;
send an interrupt indicating the failed write to the storage location to the microcontroller;
receive a request to write the data to a different storage location in the non-volatile memory from the microcontroller; and
send another command to the non-volatile memory device to write the data to the different storage location in the non-volatile memory.

2. The system of claim 1, wherein the memory controller comprises a copy buffer and wherein the memory controller is further configured to:
in response to the determination that the write to the storage location in the non-volatile memory failed:
identify an entry in the copy buffer for the data; and
store the data in the entry in the copy buffer;
wherein the request to write the data to the different storage location is a request to copy the data from the entry in the copy buffer to the different storage location.

3. The system of claim 2, wherein the memory controller is further configured to:
before the request to write the data to the different storage location is received:
receive a request to read the storage location;
read the entry of the copy buffer to obtain the data; and
return the data read from the copy buffer in response to the request to read the storage location.

4. The system of claim 1, wherein the non-volatile memory is a storage class memory device.

5. A method, comprising:
detecting, by a memory controller for a non-volatile memory, a failure of a write of data to a storage location in the non-volatile memory;
sending, by the memory controller, an indication of the failed write to the storage location to a microcontroller for the non-volatile memory;
receiving, at the memory controller, a request to write the data to a different storage location in the non-volatile memory from the microcontroller; and
performing, by the memory controller, the write of the data to the different storage location in the non-volatile memory.

6. The method of claim 5, wherein the failed write was a write to copy the data from an entry of a copy buffer to the storage location and wherein the sending the indication of the failed write comprises modifying a migration status for the entry of the copy buffer to indicate a failure of the write.

7. The method of claim 5, further comprising:
in response to detecting the failure of the write of data to the storage location in the non-volatile memory:
identifying an entry in the copy buffer for the data; and
storing the data in the entry in the copy buffer;
wherein the request to write the data to the different storage location is a request to copy the data from the entry in the copy buffer to the different storage location.

8. The method of claim 7, further comprising:
before the request to write the data to the different storage location is received:
receiving a request to write the storage location from a host processor; and
performing the write to the entry of the copy buffer.

9. The method of claim 7, further comprising:
before the request to write the data to the different storage location is received:
receiving a request to read the storage location from a host processor;
reading the entry of the copy buffer to obtain the data; and
returning the data read from the copy buffer in response to the request to read the storage location.

10. The method of claim 9,
wherein the memory controller comprises an address translation table;

wherein the method further comprises:
in response to detecting the failure of the write of data to the storage location in the non-volatile memory, updating the address translation table to map the storage location to the entry of the copy buffer; and
after the request to read the data at the different storage location is received, accessing the address translation table to identify the entry of the copy buffer to read.

11. The method of claim 10, further comprising:
after the write of the data to the different storage location is successfully performed:
updating, by a microcontroller for the non-volatile memory, a memory mapped unit (MMU) to map the storage location to the different storage location; and
updating the address translation table to remove the mapping of the storage location to the entry of the copy buffer.

12. The method of claim 5, wherein detecting the failure of the write of data to the storage location in the non-volatile memory comprises reading an error mode for the storage location at the non-volatile memory.

13. The method of claim 5, wherein the write is received from a host processor that hosts a virtualization platform and wherein the write is performed on behalf of a virtual resource implemented based on the virtualization platform.

14. A memory controller for a non-volatile memory, the memory controller comprising circuitry configured to:
receive a request to write data to a storage location in the non-volatile memory from a host processor connected to the memory controller;
perform the write of the data to the storage location in the non-volatile memory;
detect a failure of the write of the data to the storage location in the non-volatile memory;
send an indication of the failed write to the storage location to a microcontroller for the non-volatile memory;
receive a request to write the data to a different storage location in the non-volatile memory from the microcontroller; and
perform the write of the data to the different storage location in the non-volatile memory.

15. The memory controller of claim 14, wherein the memory controller is further configured to:
in response to the detection of the failure of the write of data to the storage location in the non-volatile memory:
identify an entry in the copy buffer for the data; and
store the data in the entry in the copy buffer;
wherein the request to write the data to the different storage location is a request to copy the data from the entry in the copy buffer to the different storage location.

16. The memory controller of claim 15,
wherein the memory controller comprises an address translation table; and
wherein the memory controller is further configured to:
in response to the detection of the failure of the write of data to the storage location in the non-volatile memory, update the address translation table to map the storage location to the entry of the copy buffer; and
before the request to write the data to the different storage location is received:
receive a request to read the storage location;
access the address translation table to identify the entry of the copy buffer to read;
read the entry of the copy buffer to obtain the data; and
return the data read from the copy buffer in response to the request to read the storage location.

17. The memory controller of claim 16,
wherein the circuitry of the memory controller is further configured to:
after the detection of a migration event for other data at another storage location in the non-volatile memory at the microcontroller:
identify another entry in the copy buffer;
write the other data to the other entry in the copy buffer;
update the address translation table to map the other storage location to the other entry of the copy buffer; and
before the other data is written to a destination location in the non-volatile memory for the migration event:
receive a request to read the other storage location;
access the address translation table to identify the other entry in the copy buffer to read;
read the other entry of the copy buffer to obtain the other data; and
return the other data read from the copy buffer in response to the request to read the other storage location.

18. The memory controller of claim 16, wherein the circuitry of the memory controller is further configured to:
after the detection of a migration event for other data at another storage location in the non-volatile memory at the microcontroller:
identify another entry in the copy buffer;
write the other data to the other entry in the copy buffer;
update the address translation table to map the other storage location to the other entry of the copy buffer; and
after the other data is written to a destination location for the migration event, update the address translation table to map the other storage location to the destination location for the migration event;
after the update to the address translation table to map the other storage location to the destination location:
receive a request to read the other storage location;
access the address translation table to identify the destination location in the non-volatile memory to read;
read the destination location in the non-volatile memory to obtain the other data; and
return the other data read from the non-volatile memory in response to the request to read the other storage location.

19. The memory controller of claim 15, wherein the circuitry of the memory controller is further configured to:
detect a failure of the write of the data to the different storage location in the non-volatile memory; and
in response to the detection of the failure of the write of data to the storage location, update a status for the entry in the copy buffer to indicate a migration failure.

20. The memory controller of claim 14, wherein the memory controller is implemented as part of an access device for the non-volatile memory, and wherein the access device is an application specific integrated circuit (ASIC), a system-on-chip (SoC), or a field-programmable gate array (FPGA).

* * * * *